United States Patent
Nagano et al.

(10) Patent No.: US 11,789,436 B2
(45) Date of Patent: Oct. 17, 2023

(54) DIAGNOSING DEVICE, DIAGNOSING METHOD, AND PROGRAM

(71) Applicant: MITSUBISHI HEAVY INDUSTRIES, LTD., Tokyo (JP)

(72) Inventors: Ichiro Nagano, Yokohama (JP); Mayumi Saito, Tokyo (JP); Keiji Eguchi, Tokyo (JP); Kuniaki Aoyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/781,612

(22) PCT Filed: Dec. 24, 2020

(86) PCT No.: PCT/JP2020/048494
§ 371 (c)(1),
(2) Date: Jun. 1, 2022

(87) PCT Pub. No.: WO2021/140942
PCT Pub. Date: Jul. 15, 2021

(65) Prior Publication Data
US 2023/0004153 A1    Jan. 5, 2023

(30) Foreign Application Priority Data
Jan. 6, 2020    (JP) .................. 2020-000427

(51) Int. Cl.
*G05B 23/02*    (2006.01)

(52) U.S. Cl.
CPC ..... *G05B 23/0235* (2013.01); *G05B 23/0221* (2013.01); *G05B 23/0275* (2013.01)

(58) Field of Classification Search
CPC ............ G05B 23/0235; G05B 23/0221; G05B 23/0275; G05B 23/024
See application file for complete search history.

(56) References Cited

U.S. PATENT DOCUMENTS 8,494,807 B2 * 7/2013 Pecht .................. G06F 11/008
   702/179
2006/0025925 A1    2/2006 Fushiki et al.
(Continued)

FOREIGN PATENT DOCUMENTS

JP    2003-172567    6/2003
JP    2006-39978    2/2006
(Continued)

OTHER PUBLICATIONS

Online Anomaly Detection for Hard Disk Drives Based on Mahalanobis Distance, IEEE, 2013 (Year: 2013).*
(Continued)

*Primary Examiner* — Mohammad K Islam
(74) *Attorney, Agent, or Firm* — Wenderoth, Lind & Ponack, L.L.P.

(57) ABSTRACT

Provided are a diagnosing device, a diagnosing method, and a program with which it is possible to detect abnormalities accurately even if there is a small amount of data or the number of data points varies. This diagnosing device is provided with a Mahalanobis distance calculating unit which calculates the Mahalanobis distance (referred to as 'MD value' hereinbelow) of a detected value, and an abnormality determining unit which determines the presence or absence of an abnormality on the basis of the MD value, wherein the abnormality determining unit determines the presence or absence of an abnormality by arranging that a determination that there is no abnormality is more likely to occur if the number of samples per unit space is small than if the number of samples per unit space is large.

7 Claims, 5 Drawing Sheets

(56) References Cited

U.S. PATENT DOCUMENTS

| | | | |
|---|---|---|---|
| 2009/0187381 A1 | 7/2009 | King et al. | |
| 2010/0198555 A1 | 8/2010 | Takahama et al. | |
| 2012/0041575 A1* | 2/2012 | Maeda .................. | G05B 23/024 |
| | | | 700/79 |
| 2019/0018402 A1* | 1/2019 | Enomoto ............. | G05B 23/024 |
| 2019/0264573 A1* | 8/2019 | Nagano .................. | F01D 25/00 |
| 2020/0074269 A1* | 3/2020 | Trygg .................. | G06V 10/761 |
| 2021/0173383 A1 | 6/2021 | Nagano et al. | |

FOREIGN PATENT DOCUMENTS

| | | |
|---|---|---|
| JP | 2009-186463 | 8/2009 |
| JP | 2011-170518 | 9/2011 |
| JP | 2012-67757 | 4/2012 |
| JP | 2015-164026 | 9/2015 |
| JP | 2016-163511 | 9/2016 |
| JP | 6129508 | 4/2017 |
| WO | 2019/124367 | 6/2019 |

OTHER PUBLICATIONS

International Search Report dated Mar. 16, 2021 in International (PCT) Application No. PCT/JP2020/048494.
Written Opinion of the International Searching Authority dated Mar. 16, 2021 in International (PCT) Application No. PCT/JP2020/048494.

* cited by examiner

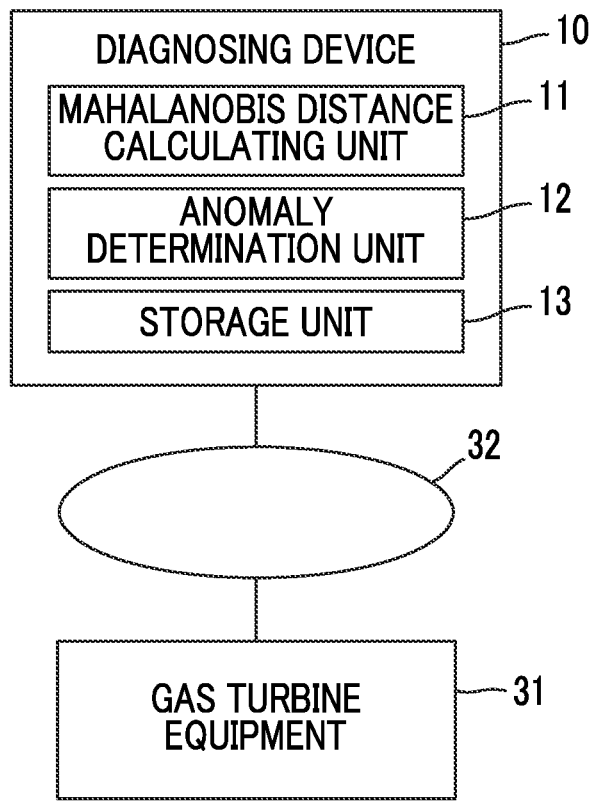
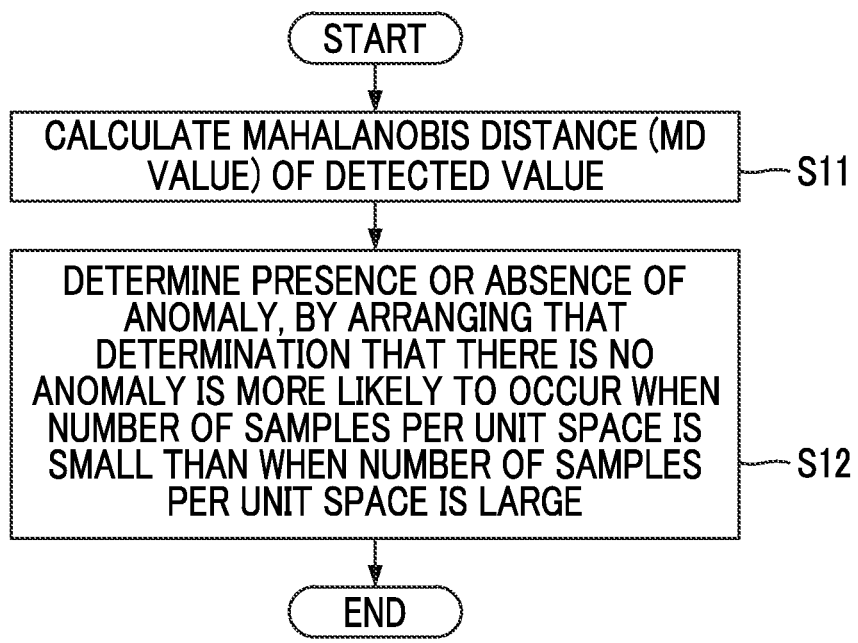

FIG. 7

```
START
  ↓
CALCULATE MAHALANOBIS DISTANCE (MD VALUE) OF DETECTED VALUE — S31
  ↓
OBTAIN CUMULATIVE PROBABILITY UP TO THRESHOLD VALUE (MDc) IN NORMAL DISTRIBUTION — S32
  ↓
OBTAIN CORRESPONDING VALUE (MDt) SUCH THAT CUMULATIVE PROBABILITY IS EQUAL TO CUMULATIVE PROBABILITY OF OBTAINED NORMAL DISTRIBUTION, IN t-DISTRIBUTION — S33
  ↓
MULTIPLY MD VALUE CALCULATED BY MT METHOD BY MDc/MDt TO OBTAIN MD' VALUE — S34
  ↓
COMPARE MD' VALUE WITH MD THRESHOLD VALUE (MDc) TO PERFORM ANOMALY DIAGNOSIS — S35
  ↓
END
```

FIG. 8

```
MD VALUE CALCULATED BY MD METHOD — 201
  ↓ COMPARISON
MD THRESHOLD VALUE — 202
  ├─ NORMAL DISTRIBUTION MD THRESHOLD VALUE — 203
  └─ t-DISTRIBUTION MD THRESHOLD VALUE — 204
  ↑ SELECTION
NUMBER OF SAMPLES — 205
```

DIAGNOSING DEVICE, DIAGNOSING METHOD, AND PROGRAM

TECHNICAL FIELD

The present disclosure relates to a diagnosing device, a diagnosing method, and a program. The present application claims priority based on Japanese Patent Application No. 2020-000427 filed in Japan on Jan. 6, 2020, the contents of which are incorporated herein by reference.

BACKGROUND ART

The Mahalanobis Taguchi System (MT method) using a Mahalanobis distance is widely used in anomaly detection systems in power generation facilities and remote monitoring systems (for example, PTL 1). As described in PTL 1, in the Mahalanobis distance, it is assumed that normal data follow a normal distribution, but actual data does not follow a normal distribution in many cases. Therefore, in an anomaly detection preprocessing apparatus described in PTL 1, it is determined whether or not the distribution data for two variables within a predetermined period, measured at a normal time, has a distribution according to the normal distribution, a predetermined number of pieces of distribution data selected from the distribution data determined not to follow the normal distribution are fitted to a tentative nonlinear model, and a correction term for correcting the distribution data is calculated by the difference between the tentative nonlinear model and a regression line. A tentative nonlinear model in which the distribution data corrected by the correction term results in a distribution that most follows the normal distribution is selected as an anomaly detection model when used in anomaly detection, and the correction term calculated based on the anomaly detection model is selected as the correction term used for the anomaly detection.

Further, the anomaly detection apparatus described in PTL 1 calculates correction determination data obtained by correcting determination data that is measurement data to be determined as normal or abnormal, based on the correction term selected by the anomaly detection preprocessing apparatus, and determines whether or not the correction determination data is abnormal, based on the Mahalanobis distance. According to the anomaly detection preprocessing apparatus and the anomaly detection apparatus described in PTL 1, the normal distribution of the normal data is quantitatively evaluated and the anomaly detection model and the correction term used for anomaly detection are selected based on the distribution data measured at the normal time, so that it is possible to accurately detect data (that is, abnormal data) that deviates from the measurement data obtained at the normal time.

CITATION LIST

Patent Literature

[PTL 1] Japanese Patent No. 6129508

SUMMARY OF INVENTION

Technical Problem

As described above, in the anomaly detection preprocessing apparatus described in PTL 1, the correction term is selected based on the result of determining whether or not the data distribution follows the normal distribution. Therefore, a plurality of pieces of data are required for determining whether or not the distribution follows the normal distribution. However, in equipment that may continue to operate for a while (for example, several months) once the equipment is started, such as the gas turbine equipment shown as an example in PTL 1, there is a problem that it takes a long time to collect a plurality of pieces of data that can be measured only once at one startup (for example, a time required for a predetermined state change at startup, the maximum value, minimum value, average value, total value, or the like of data at startup).

The present disclosure has been made to solve the above problems, and an object is to provide a diagnosing device, a diagnosing method, and a program capable of accurately detecting anomalies even when the amount of data is small or the number of data pieces varies.

Solution to Problem

In order to solve the above problems, a diagnosing device according to the present disclosure includes: a Mahalanobis distance calculating unit that calculates a Mahalanobis distance (referred to as "MD value" hereinbelow) of a detected value; and an anomaly determination unit that determines a presence or absence of an anomaly based on the MD value, wherein the anomaly determination unit determines the presence or absence of an anomaly in a manner that a determination that there is no anomaly is more likely to occur when the number of samples per unit space is small than when the number of samples per unit space is large.

Further, a diagnosing method according to the present disclosure includes: a step of calculating an MD value of a detected value, and a step of determining a presence or absence of an anomaly, based on the MD value in a manner that a determination that there is no anomaly is more likely to occur when the number of samples per unit space is small than when the number of samples per unit space is large.

Further, a program according to the present disclosure causes a computer to execute: a step of calculating an MD value of a detected value, and a step of determining a presence or absence of an anomaly, based on the MD value in a manner that a determination that there is no anomaly is more likely to occur when the number of samples per unit space is small than when the number of samples per unit space is large.

Advantageous Effects of Invention

According to the diagnosing device, the diagnosing method, and the program of the present disclosure, it is possible to detect anomalies accurately even when there is a small amount of data or the number of data points varies.

BRIEF DESCRIPTION OF DRAWINGS

FIG. 1 is a diagram showing a configuration example of a diagnosing device according to a first embodiment of the present disclosure.

FIG. 2 is a flowchart showing an operation example of the diagnosing device according to the first embodiment of the present disclosure.

FIG. 7 is a flowchart showing an operation example of the diagnosing device according to the third embodiment of the present disclosure.

FIG. 8 is a system flow diagram showing the operation example of the diagnosing device according to the third embodiment of the present disclosure.

DESCRIPTION OF EMBODIMENTS

First Embodiment (Configuration of Diagnosing Device)

Figure 3:
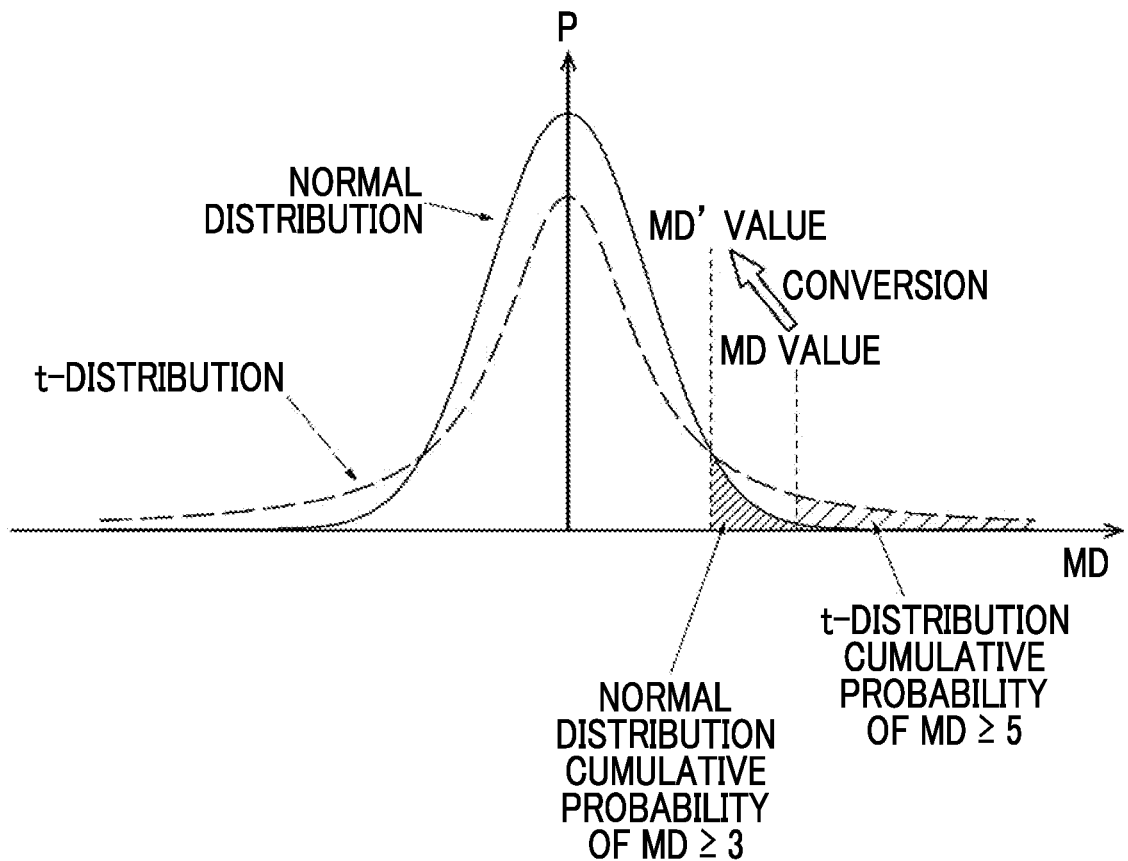
FIG. 3 is a schematic diagram for explaining a diagnosing device according to a second embodiment of the present disclosure.

Hereinafter, a diagnosing device according to an embodiment of the present disclosure will be described with reference to FIGS. 1 and 2. In each figure, the same reference numerals are used for the same or corresponding configurations, and the description thereof will be omitted as appropriate. The present embodiment will be described assuming that a diagnosing device 10 is provided in a monitoring center for monitoring a gas turbine and is used for detecting an anomaly in the gas turbine, but the present invention is not limited thereto.

FIG. 1 is a diagram showing a configuration example of the diagnosing device 10 according to the first embodiment of the present disclosure. The diagnosing device 10 shown in FIG. 1 is, for example, a device that monitors gas turbine equipment 31 installed in a power plant and diagnoses the presence or absence of an anomaly. The gas turbine equipment 31 and the diagnosing device 10 are connected to each other via a network 32 such that information can be exchanged. For example, the diagnosing device 10 receives gas turbine operation data, alarm information, inquiry information, and the like transmitted from the gas turbine equipment 31 at predetermined timings. The diagnosing device 10 stores various pieces of acquired information in a storage unit 13 (details will be described later). In the present embodiment, it is described that the diagnosing device 10 is provided at a remote location from the gas turbine equipment 31 via the network 32, but the position of the diagnosing device 10 is not limited to this.

The diagnosing device 10 can be configured by using, for example, a computer such as a server or a personal computer and its peripheral devices. The diagnosing device 10 includes a Mahalanobis distance calculating unit 11, an anomaly determination unit 12, and a storage unit 13, as a functional configuration composed of a combination of hardware such as a computer and its peripheral devices and software such as a program executed by the computer.

The storage unit 13 stores measurement data (operation data, or the like) within a predetermined period obtained from measurement equipment provided at a plurality of locations of the gas turbine equipment 31. Examples of the measurement data include measurement data within a predetermined period measured in an unsteady state in which normal data varies particularly, such as when the gas turbine is started, and measurement data that is a target for determining normality or anomaly of gas turbine equipment. Further, in the present embodiment, examples of the plurality of locations of the gas turbine equipment include a combustor, a compressor, or the like, and examples of the measurement data include information such as the temperature, the voltage, the current, the rotation speed, the pressure value, the time required for a predetermined state change at the time of startup or the like, and the maximum value, the minimum value, the average value, the total value, or the like of the data at the time of startup or the like, obtained from the plurality of locations. Further, the storage unit 13 stores values such as the number of samples (number of data pieces), the mean value, the standard deviation, the inverse matrix of the correlation matrix, and the threshold value for anomaly determination related to a unit space in the MT method.

The Mahalanobis distance calculating unit 11 calculates the MD value of the measurement data (detected value). The Mahalanobis distance calculating unit 11 obtains a k-dimensional MD value by using the following expression. Here, k is the number of items, i and j are 1 to k, $\alpha_{ij}$ are the i and j components of the inverse matrix of the correlation matrix, and $m_i$, $m_j$, $\sigma_i$ and $\sigma_j$ are the mean value and standard deviation in the unit space, respectively. The unit space is a reference data group consisting of a plurality of MD values based on the measurement data at the normal time, and is calculated based on a plurality of samples of a set of measurement data of k items. The unit space is updated based on new measurement data by, for example, the Mahalanobis distance calculating unit 11.

$$MD^2 = \frac{1}{k}\sum \alpha_{ij}\left(\frac{x_i - m_i}{\sigma_i}\right)\left(\frac{x_j - m_j}{\sigma_j}\right)$$

In addition, the determination using the Mahalanobis distance is a method of expressing the characteristic amount (multivariable) of a certain group with one parameter (Mahalanobis distance), and evaluating whether certain measurement data is good or bad by the distance from the basic data of a healthy group (measurement data at the normal time). When some measurement data is bad, the distance from the healthy group becomes larger, and when the measurement data is good, the distance from the healthy group becomes smaller.

The anomaly determination unit 12 determines the presence or absence of an anomaly, based on the MD value calculated by the Mahalanobis distance calculating unit 11. In this case, the anomaly determination unit 12 determines the presence or absence of an anomaly in a manner that a determination that there is no anomaly is more likely to occur when the number of samples per unit space is small than when the number of samples per unit space is large. The anomaly determination unit 12 sets, for example, a threshold value (also referred to as an MD threshold value) for the Mahalanobis distance, and determines as normal, when the Mahalanobis distance is equal to or less than the threshold value, and determines as abnormal, and when the Mahalanobis distance is larger than the threshold value.

(Operation of Diagnosing Device)

Next, with reference to FIG. 2, the basic operation of the diagnosing device 10 shown in FIG. 1 will be described.

FIG. 2 is a flowchart showing an operation example of the diagnosing device according to the first embodiment of the present disclosure.

The process shown in FIG. 2 is started according to, for example, a predetermined operation input of the operator. It is assumed that the storage unit 13 stores the measurement data regarding the operation of the gas turbine measured by the gas turbine equipment 31. In the diagnosing device 10, first, the Mahalanobis distance calculating unit 11 calculates the MD value of the measurement data (detected value) (step S11). Next, the anomaly determination unit 12 determines a presence or absence of the anomaly in a manner that a determination that there is no anomaly is more likely to occur when the number of samples per unit space is small than when the number of samples per unit space is large (step S12).

In step S12, for example, the anomaly determination unit 12 determines the presence or absence of an anomaly, by increasing the threshold value for anomaly determination for the MD value, when the number of samples per unit space is small. When the threshold value becomes large, it is not often determined that there is an anomaly when the MD value is large. Alternatively, for example, when the number of samples per unit space is small, the anomaly determination unit 12 may correct the MD value calculated by the Mahalanobis distance calculating unit 11 to be small by multiplying the MD value by a coefficient for reducing the MD value. When the MD value becomes small, it is not often determined that there is an anomaly even when the threshold value for determining the anomaly does not change. Alternatively, the anomaly determination unit 12 may combine the correction of the threshold value and the correction of the MD value.

When the number of samples is small, the distribution of MD values, which is the basis of the unit space, does not follow the normal distribution in many cases. In this case, for example, when the threshold value is set assuming a normal distribution, it is considered that the MD value often exceeds the threshold value even though it is normal. On the other hand, in a manner that a determination that there is no anomaly is more likely to occur when the number of samples per unit space is small than when the number of samples per unit space is large, in the present embodiment, it is possible to reduce the number of cases where an anomaly is erroneously detected even though it is normal. That is, it is possible to suppress the occurrence of erroneous detection and improve the accuracy of anomaly detection. The anomaly determination unit 12 can prevent the occurrence of erroneous detection that is determined to be normal, even though it is abnormal, by using, for example, a combination of the anomaly detection technique described in PTL 1.

The determination result of the presence or absence of an anomaly by the anomaly determination unit 12 can be stored in the storage unit 13, for example, output from a display device, a printing device, an acoustic output device, or the like (not shown) included in the diagnosing device 10, or transmitted to an external terminal via a communication device (not shown) included in the diagnosing device 10.

Second Embodiment

Figure 4:
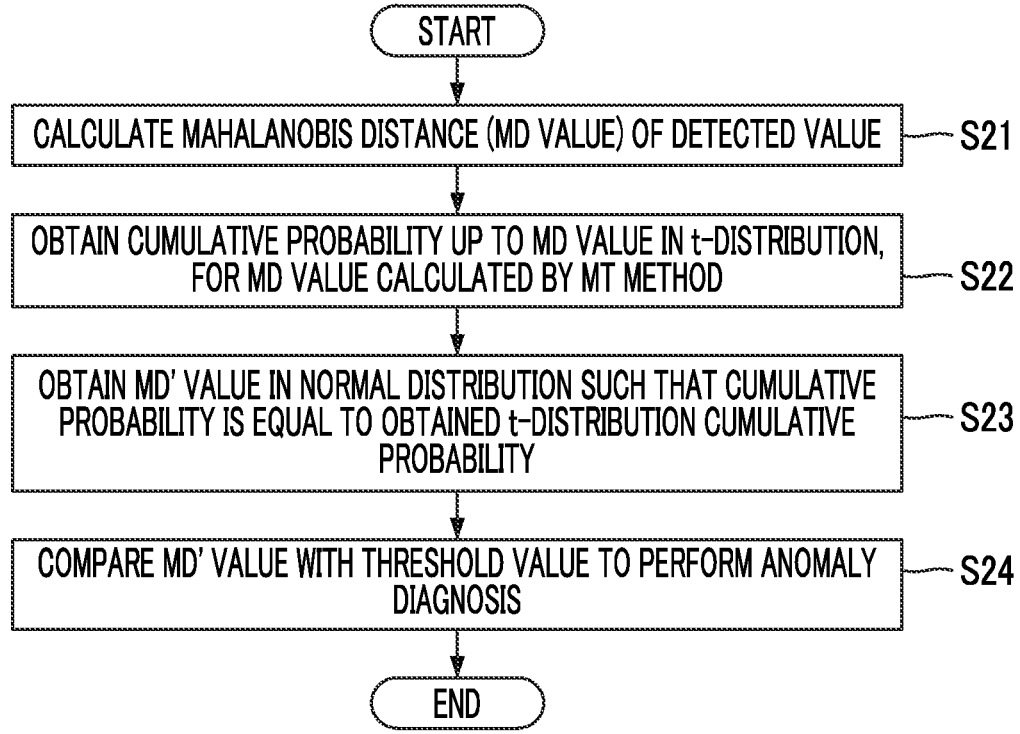
FIG. 4 is a flowchart showing an operation example of the diagnosing device according to the second embodiment of the present disclosure.
Figure 5:
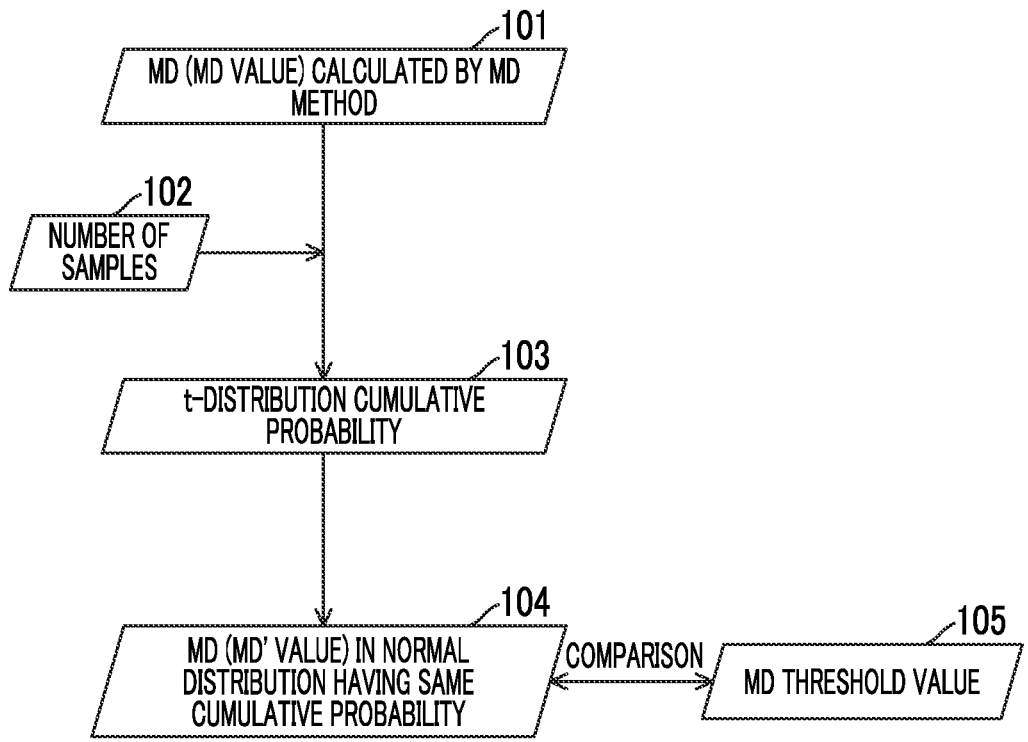
FIG. 5 is a system flow diagram showing the operation example of the diagnosing device according to the second embodiment of the present disclosure.

Next, a second embodiment of the present disclosure will be described with reference to FIGS. 3 to 5. FIG. 3 is a schematic diagram for explaining a diagnosing device according to the second embodiment of the present disclosure. FIG. 4 is a flowchart showing an operation example of the diagnosing device according to the second embodiment of the present disclosure. FIG. 5 is a system flow diagram showing an operation example of the diagnosing device according to the second embodiment of the present disclosure.

The basic configuration of the diagnosing device of the second embodiment is the same as that of the diagnosing device 10 of the first embodiment shown in FIG. 1. In the second embodiment, as compared with the first embodiment, a part of the operation of the anomaly determination unit 12 shown in FIG. 1 is detailed.

FIG. 3 is a diagram schematically showing the probability distribution of the Mahalanobis distance MD with a normal distribution and n (or Student's t-distribution). Further, FIG. 3 shows the normal distribution cumulative probability of MD≥3 (inverse cumulative distribution function of normal distribution) and the t-distribution cumulative probability of MD≥5 (inverse cumulative distribution function in a t-distribution) by shading.

The mathematically correct probability density function is a t-distribution when the number of samples is small, and approaches a normal distribution when the number of samples is large. When the number of samples is infinite, the t-distribution and the normal distribution match. Further, when the number of sensors is small and 1, it is equal to the t-test. Even with the same MD, the cumulative probability changes depending on the assumed probability density function. In particular, the t-distribution is wider than the normal distribution. In a case of diagnosing "abnormal in 3<MD value", when the number of data is small and it is a t-distribution, even though "3<MD value" is a relatively common event, there are many false detections that "3<MD value" is regarded as "abnormal".

Therefore, in the second embodiment, the anomaly determination unit 12 corrects the MD value calculated by the Mahalanobis distance calculating unit 11 to an MD' value (second MD value), based on a cumulative probability in a t-distribution having a degree of freedom according to the number of samples (hereinafter referred to as the t-distribution cumulative probability) and a cumulative probability in a normal distribution corresponding to the t-distribution cumulative probability, and determines the presence or absence of an anomaly, based on the result of comparing the MD' value with a predetermined threshold value.

As shown in FIG. 4, in the second embodiment, the Mahalanobis distance calculating unit 11 first calculates the MD value of the measurement data (detected value) (step S21). In this case, it is assumed that the MD value is "5".

Next, the anomaly determination unit 12 obtains the t-distribution cumulative probability up to the MD value ("5") in the t-distribution, for the MD value calculated by the Mahalanobis distance calculating unit 11 via the MT method (step S22).

Next, the anomaly determination unit 12 obtains an MD' value in the normal distribution such that the cumulative probability is equal to the obtained t-distribution cumulative probability (normal distribution cumulative probability) (step S23). In this case, it is assumed that the MD' value is "3".

Next, the anomaly determination unit 12 compares the MD' value with the threshold value to perform an anomaly diagnosis (step S24).

The anomaly determination unit 12 can obtain the MD' value, which is the corrected MD value, by using, for example, the following expression.

$$MD'=\sqrt{2}*\mathrm{erf}_{inv}(2*t_{cdf}(MD,\nu)-1)$$

Here, tcdf is the cumulative distribution function of the t-distribution, erfinv is the inverse function of the error function, ν is a degree of freedom, in (N−A), N is the number of samples in the unit space (the number of data), and A is the number of sensors.

As shown in FIG. 5, the anomaly determination unit 12 calculates a t-distribution cumulative probability (103), based on the MD value (101) calculated by the MD Mahalanobis distance calculating unit 11 via the MT method and the number of samples (sample number) (102). Further, the anomaly determination unit 12 calculates the MD' value (104) in a normal distribution having the same cumulative probability. Then, the anomaly determination unit 12 compares the MD' value (104) with the MD threshold value (105).

As described above, according to the second embodiment, it is possible to reduce the case where an anomaly is erroneously detected even though it is normal, as in the first embodiment. Further, by using the above expression, the same calculation expression can be used from when the number of samples is small to when the number of samples is large.

Third Embodiment

Figure 6:
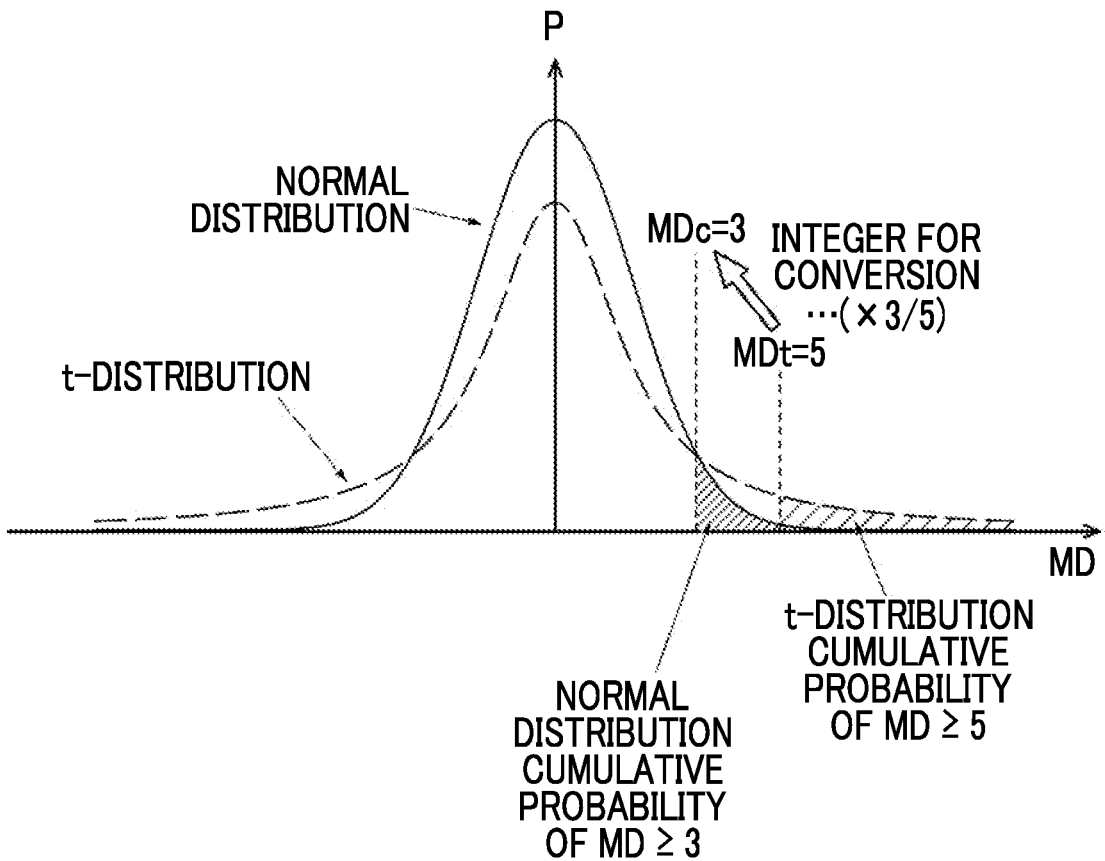
FIG. 6 is a schematic diagram for explaining a diagnosing device according to a third embodiment of the present disclosure.

Next, a third embodiment of the present disclosure will be described with reference to FIGS. 6 to 8. FIG. 6 is a schematic diagram for explaining a diagnosing device according to the third embodiment of the present disclosure. FIG. 7 is a flowchart showing an operation example of the diagnosing device according to the third embodiment of the present disclosure. FIG. 8 is a system flow diagram showing an operation example of the diagnosing device according to the third embodiment of the present disclosure.

The basic configuration of the diagnosing device of the third embodiment is the same as that of the diagnosing device 10 of the first embodiment shown in FIG. 1. In the third embodiment, as compared with the first embodiment, a part of the operation of the anomaly determination unit 12 shown in FIG. 1 is detailed.

FIG. 6 is a diagram schematically showing the probability distribution of the Mahalanobis distance MD with a normal distribution and the t-distribution, as in FIG. 3. Further, FIG. 6 shows the normal distribution cumulative probability of MD≥3 (inverse cumulative distribution function of normal distribution) and the t-distribution cumulative probability of MD≥5 by shading. In FIG. 6, the value of the threshold value MDc is "3".

In the third embodiment, the anomaly determination unit 12 obtains the cumulative probability (normal distribution cumulative probability) up to a predetermined threshold value MDc in the normal distribution, obtains a corresponding value MDt corresponding to a threshold value MDc in the t-distribution having a degree of freedom according to the number of samples in which the t-distribution cumulative probability is equal to the normal distribution cumulative probability, and determines the presence or absence of an anomaly, based on the result of comparing the threshold value MDc with the MD' value (second MD value) obtained by correcting the MD value based on the threshold value MDc and the corresponding value MDt. In the example shown in FIG. 6, the corresponding value MDt corresponding to the threshold value MDc "3" is assumed to be "5". In this case, for example, the value (MD' value) obtained by multiplying the MD value by 3/5 is compared with the threshold value MDc.

As shown in FIG. 7, in the third embodiment, the Mahalanobis distance calculating unit 11 first calculates the MD value of the measurement data (detected value) (step S31). Next, the anomaly determination unit 12 obtains the cumulative probability up to the threshold value (MDc) in the normal distribution (step S32). Next, the anomaly determination unit 12 obtains a corresponding value (MDt) in the t-distribution such that the cumulative probability is equal to the cumulative probability of the obtained normal distribution (step S33). In FIG. 6, MDc=3 and MDt=5. From this, it can be seen that MD=3 in the normal distribution is equivalent to MD=5 in terms of the probability of occurrence of an event in the t-distribution. However, the corresponding value of the t-distribution changes depending on the number of samples.

Next, the anomaly determination unit 12 multiplies the MD value calculated by the Mahalanobis distance calculating unit 11 via the MT method by MDc/MDt to obtain the MD' value (second MD value) (step S34). In the example shown in FIG. 6, MD' value=MD value×3/5. Next, the anomaly determination unit 12 compares the MD' value with the MD threshold value (MDc) to perform an anomaly diagnosis (step S35).

The anomaly determination unit 12 can obtain the MD' value, which is the corrected MD value, by using, for example, the following expression.

$$MD' = \frac{MD * MDc}{tinv\left(\frac{1 - erf\left(\frac{MDc}{\sqrt{2}}\right)}{2}, v\right)}$$

Here, MDc is the threshold value in the MT method, tiny is the inverse cumulative distribution function of the t-distribution, erf is the error function, ν is the degree of freedom, in (N−A), N is the number of samples in the unit space (the number of data), and A is the number of sensors.

As shown in FIG. 8, the anomaly determination unit 12 of the third embodiment may compare the MD (MD value) (201) calculated by the MD Mahalanobis distance calculating unit 11 via the MT method with the MD threshold value selected from the normal distribution MD threshold value (203) or the t-distribution MD threshold value (204) based on the number of samples (sample number) (205). In this case, the t-distribution MD threshold value (204) is smaller than the normal distribution MD threshold value (203) and is selected when the number of samples is small. That is, in the third embodiment, the anomaly determination unit 12 increases a predetermined threshold value to be compared with the MD value when the number of samples is small, and determines that there is an anomaly when the MD value is larger than the threshold value.

As described above, according to the third embodiment, it is possible to reduce the case where an anomaly is erroneously detected even though it is normal, as in the first embodiment. Further, by using the above expression, the calculation process can be simplified (the parameter of the function can be the threshold value MDc which is a constant instead of the MD value), and the processing load can be reduced as compared with the second embodiment.

Fourth Embodiment

Figure 9:
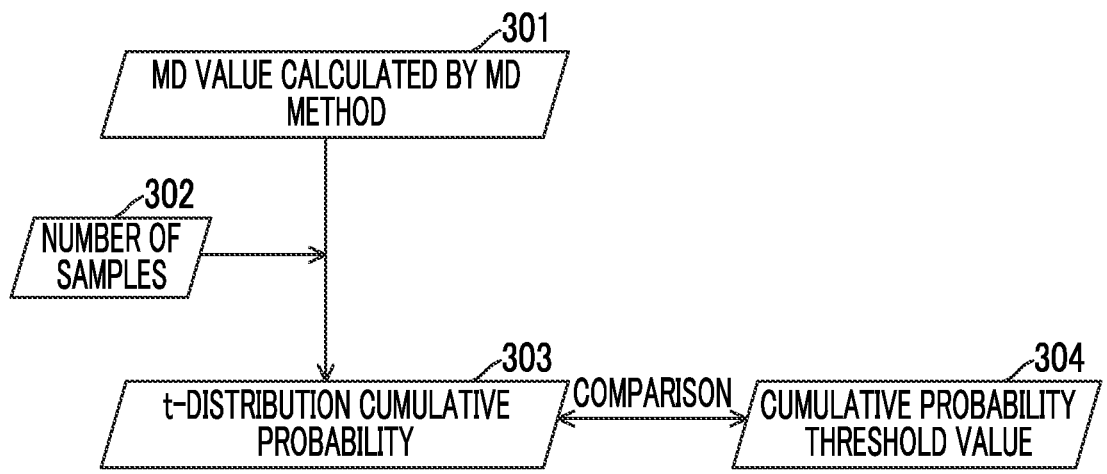
FIG. 9 is a system flow diagram showing an operation example of a diagnosing device according to a fourth embodiment of the present disclosure.

Next, a fourth embodiment of the present disclosure will be described with reference to FIG. 9. FIG. 9 is a system flow diagram showing an operation example of the diagnosing device according to the fourth embodiment of the present disclosure. The basic configuration of the diagnosing device of the fourth embodiment is the same as that of the diagnosing device 10 of the first embodiment shown in FIG. 1. In the fourth embodiment, as compared with the first embodiment, a part of the operation of the anomaly determination unit 12 shown in FIG. 1 is detailed.

As shown in FIG. 9, the anomaly determination unit 12 of the fourth embodiment calculates a t-distribution cumulative probability (303), based on the MD value (301) calculated by the MD Mahalanobis distance calculating unit 11 via the MT method and the number of samples (sample number) (302), and determines the anomaly by comparing the t-distribution cumulative probability (303) with the cumulative probability threshold value (304) that is the cumulative probability of the normal distribution corresponding to the predetermined threshold value. That is, in the diagnosing device 10 of the fourth embodiment, the Mahalanobis distance calculating unit 11 calculates the MD value of the measurement data (detected value). Then, the anomaly determination unit 12 compares the cumulative probability up to the MD value obtained according to the number of samples in the unit space with the predetermined cumulative probability threshold value, and determines the presence or absence of an anomaly based on the comparison result to determine the presence or absence of anomaly based on the MD value.

Other Embodiments

Although the embodiment of the present disclosure has been described in detail with reference to the drawings, the specific configuration is not limited to this embodiment, and includes design changes and the like within a range not deviating from the gist of the present disclosure.

<Computer Configuration>

Figure 10:
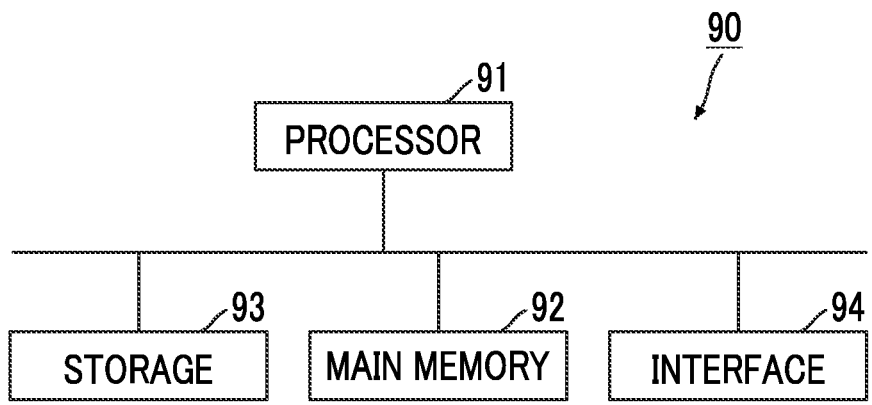
FIG. 10 is a schematic block diagram illustrating a configuration of a computer according to at least one embodiment.

FIG. 10 is a schematic block diagram illustrating a configuration of a computer according to at least one embodiment.

A computer 90 includes a processor 91, a main memory 92, a storage 93, and an interface 94.

The diagnosing device 10 described above is mounted on the computer 90. The operation of each processing unit described above is stored in the storage 93 in the form of a program. The processor 91 reads a program from the storage 93, expands the read program into the main memory 92, and executes the above process according to the program. Further, the processor 91 secures a storage area corresponding to each of the above-described storage units in the main memory 92, according to the program.

The program may be for achieving some of the functions performed by the computer 90. For example, the program may perform its function in combination with another program already stored in the storage or in combination with another program mounted on another device. In another embodiment, the computer may include a custom large scale integrated circuit (LSI) such as a programmable logic device (PLD) in addition to or in place of the above configuration. Examples of PLDs include a programmable array logic (PAL), a generic array logic (GAL), a complex programmable logic device (CPLD), and a field programmable gate array (FPGA). In this case, some or all of the functions achieved by the processor may be achieved by the integrated circuit.

Examples of the storage 93 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 93 may be an internal medium directly connected to the bus of the computer 90, or may be an external medium connected to the computer 90 through the interface 94 or a communication line. Further, when this program is delivered to the computer 90 through a communication line, the computer 90 receiving the delivered program may develop the program in the main memory 92 and execute the above process. In at least one embodiment, the storage 93 is a non-transitory tangible storage medium.

<Additional Notes>

The diagnosing device 10 according to each embodiment is understood as follows, for example.

(1) A diagnosing device 10 according to a first aspect includes a Mahalanobis distance calculating unit 11 that calculates an MD value of measurement data (detected value), and an anomaly determination unit 12 that determines a presence or absence of an anomaly based on the MD value, in which the anomaly determination unit 12 determines the presence or absence of an anomaly in a manner that a determination that there is no anomaly is more likely to occur when the number of samples per unit space is small than when the number of samples per unit space is large.

(2) The diagnosing device 10 of the second aspect is the diagnosing device 10 of (1), in which the anomaly determination unit 12 corrects the MD value to an MD' value (second MD value), based on a t-distribution cumulative probability having a degree of freedom according to the number of samples and a cumulative probability in a normal distribution corresponding to the t-distribution cumulative probability, and determines the presence or absence of an anomaly, based on a result of comparing the MD' value (second MD value) with a predetermined threshold value.

(3) The diagnosing device of the third aspect is the diagnosing device 10 of (1), the anomaly determination unit 12 obtains a cumulative probability up to a predetermined threshold value MDc in a normal distribution, obtains a corresponding value MDt corresponding to the threshold value in the t-distribution having a degree of freedom according to the number of samples in which a cumulative probability is equal to the obtained cumulative probability, and determines the presence or absence of an anomaly, based on the result of comparing the threshold value MDc with the MD' value (second MD value) obtained by correcting the MD value based on the threshold value MDc and the corresponding value MDt.

(4) The diagnosing device of the fourth aspect is the diagnosing device 10 of (1), the anomaly determination unit 12 increases a predetermined threshold value to be compared with the MD value when the number of samples is small, and determines that there is the anomaly when the MD value is larger than the threshold value.

(5) The diagnosing device of the fourth aspect includes a Mahalanobis distance calculating unit 11 that calculates a Mahalanobis distance (MD value) of measurement data (detected value); and an anomaly determination unit 12 that determines a presence or absence of an anomaly based on the MD value, in which the anomaly determination unit 12 compares the cumulative probability (303) up to the MD value obtained according to the number of samples in the unit space with the predetermined cumulative probability threshold value (304), and determines a presence or absence of an anomaly based on the comparison result.

According to each aspect described above, it is possible to reduce erroneous detection in which a normal value is determined to be an abnormal value when the number of samples (data used for calculating the unit space) is small, and improve detection accuracy.

INDUSTRIAL APPLICABILITY

Reference Signs List

10 Diagnosing device
11 Mahalanobis distance calculating unit
12 Anomaly determination unit

The invention claimed is:

1. A diagnosing device for detecting an anomaly in a gas turbine, the device comprising:
 a Mahalanobis distance calculating unit that calculates a Mahalanobis distance (MD value) of a detected value received from a measurement equipment provided at the gas turbine; and
 an anomaly determination unit that determines a presence or absence of an anomaly based on the MD value, wherein
 the anomaly determination unit determines the presence or absence of an anomaly of the gas turbine in a manner that a determination that there is no anomaly is more likely to occur when the number of samples per unit space is smaller than when the number of samples per unit space is large, wherein
 the anomaly determination unit is configured to correct the MD value to a second MD value, based on a cumulative probability in a t-distribution having a degree of freedom according to the number of samples and a cumulative probability in a normal distribution corresponding to the cumulative probability in the t-distribution, and determine the presence or absence of an anomaly, based on a result of comparing the second MD value with a predetermined threshold value.

2. A diagnosing device for detecting an anomaly in a gas turbine, the device comprising:
 a Mahalanobis distance calculating unit that calculates a Mahalanobis distance (MD value) of a detected value received from a measurement equipment provided at the gas turbine; and
 an anomaly determination unit that determines a presence or absence of an anomaly based on the MD value, wherein
 the anomaly determination unit determines the presence or absence of an anomaly of the gas turbine in a manner that a determination that there is no anomaly is more likely to occur when the number of samples per unit space is smaller than when the number of samples per unit space is large
 wherein
 the anomaly determination unit is configured to obtain a cumulative probability up to a predetermined threshold value in a normal distribution, obtains a corresponding value corresponding to the threshold value in a t-distribution having a degree of freedom corresponding to the number of samples in which a cumulative probability is equal to the obtained cumulative probability, and determine the presence or absence of an anomaly, based on a result of comparing the threshold value with a second MD value obtained by correcting the MD value based on the threshold value and the corresponding value.

3. A diagnosing device for detecting an anomaly in a gas turbine, the device comprising:
 a Mahalanobis distance calculating unit that calculates a Mahalanobis distance (MD value) of a detected value received from a measurement equipment provided at the gas turbine; and
 an anomaly determination unit that determines a presence or absence of an anomaly, based on the MD value, wherein
 the anomaly determination unit compares a cumulative probability up to the MD value, obtained according to the number of samples in a unit space, with a predetermined cumulative probability threshold value, and determines a presence or absence of an anomaly of the gas turbine, based on a comparison result.

4. A diagnosing method for detecting an anomaly in a gas turbine, the method comprising:
 a step of calculating a Mahalanobis distance (MD value) of a detected value received from a measurement equipment provided at the gas turbine; and
 a step of determining a presence or absence of an anomaly of the gas turbine based on the MD value in a manner that a determination that there is no anomaly is more likely to occur when the number of samples per unit space is smaller than when the number of samples per unit space is large,
 wherein, in the step of determining a presence or absence of an anomaly, correcting the MD value to a second MD value, based on a cumulative probability in a t-distribution having a degree of freedom according to the number of samples and a cumulative probability in a normal distribution corresponding to the cumulative probability in the t-distribution, and determining the presence or absence of an anomaly, based on a result of comparing the second MD value with a predetermined threshold value.

5. A non-transitory computer-readable storage medium that stores a program that causes a computer to execute:
 a step of calculating a Mahalanobis distance (MD value) of a detected value received from a measurement equipment provided at a gas turbine; and
 a step of determining a presence or absence of an anomaly of the gas turbine based on the MD value in a manner that a determination that there is no anomaly is more likely to occur when the number of samples per unit space is smaller than when the number of samples per unit space is large,
 wherein, in the step of determining a presence or absence of an anomaly, correcting the MD value to a second MD value, based on a cumulative probability in a t-distribution having a degree of freedom according to the number of samples and a cumulative probability in a normal distribution corresponding to the cumulative probability in the t-distribution, and determining the presence or absence of an anomaly, based on a result of comparing the second MD value with a predetermined threshold value.

6. A diagnosing method for detecting an anomaly is a gas turbine, the method comprising:
 a step of calculating a Mahalanobis distance (MD value) of a detected value received from a measurement equipment provided at the gas turbine; and
 a step of determining a presence or absence of an anomaly of the gas turbine based on the MD value in a manner that a determination that there is no anomaly is more likely to occur when the number of samples per unit space is smaller than when the number of samples per unit space is large, wherein, in the step of determining a presence or absence of an anomaly, obtaining a cumulative probability up to a predetermined threshold value in a normal distribution, obtaining a corresponding value corresponding to the threshold value in a t-distribution having a degree of freedom corresponding to the number of samples in which a cumulative probability is equal to the obtained cumulative probability, and determining the presence or absence of an anomaly, based on a result of comparing the threshold value with a second MD value obtained by correcting the MD value based on the threshold value and the corresponding value.

7. A non-transitory computer-readable storage medium that stores a program that causes a computer to execute:
   a step of calculating a Mahalanobis distance (MD value) of a detected value received from a measurement equipment provided at a gas turbine; and
   a step of determining a presence or absence of an anomaly of the gas turbine based on the MD value in a manner that a determination that there is no anomaly is more likely to occur when the number of samples per unit space is smaller than when the number of samples per unit space is large, wherein, in the step of determining a presence or absence of an anomaly, obtaining a cumulative probability up to a predetermined threshold value in a normal distribution, obtaining a corresponding value corresponding to the threshold value in a t-distribution having a degree of freedom corresponding to the number of samples in which a cumulative probability is equal to the obtained cumulative probability, and determining the presence or absence of an anomaly, based on a result of comparing the threshold value with a second MD value obtained by correcting the MD value based on the threshold value and the corresponding value.

* * * * *